July 15, 1952     W. L. BUFFENMYER     2,603,092
CONTINUOUS MAXIMUM-READING DAMPED PRESSURE GAUGE
Filed Feb. 2, 1949                    2 SHEETS—SHEET 1

INVENTOR.
WAYNE L BUFFENMYER
BY
Bruno C. Lechler
ATTORNEY

July 15, 1952 W. L. BUFFENMYER 2,603,092
CONTINUOUS MAXIMUM-READING DAMPED PRESSURE GAUGE
Filed Feb. 2, 1949 2 SHEETS—SHEET 2

INVENTOR.
WAYNE L. BUFFENMYER
BY
Bruno C. Lechler
ATTORNEY

Patented July 15, 1952

2,603,092

UNITED STATES PATENT OFFICE 2,603,092

CONTINUOUS MAXIMUM-READING DAMPED PRESSURE GAUGE

Wayne L. Buffenmyer, Sellersville, Pa., assignor to American Machine and Metals, Inc., New York, N. Y., a corporation of Delaware Application February 2, 1949, Serial No. 74,110

4 Claims. (Cl. 73—392)

1

This invention is designed to protect a pressure gauge from sudden fluctuations in pressure. It also facilitates reading the pointer of a gauge connected to a line having a fluctuating pressure.

When the gauge is connected to a fluid line wherein the pressure is fluctuating sharply, the gauge mechanism attempts to respond to these rapid changes. Frequently the inertia of the parts prevents the pointer from registering the maximum pressure before the pressure wave has already started to drop. Furthermore, the continual movement of the mechanism during which the pointer vibrates over a wide range wears out the delicate mechanism which transmits movement from the pressure unit to the pointer. Ordinarily only the maximum pressure during the fluctuations is of interest.

The invention provides protection against two types of fluctuations, a sudden rise of great intensity, and a cyclical fluctuation over constant range such as when the gauge is connected to the discharge end of a reciprocating pump.

The invention protects the gauge by placing two independent passages between the line whose pressure is to be measured and the pressure-responsive unit. One of these passages has a small diameter and contains a check valve permitting fluid to flow only to the gauge, not back to the pressure line. The check valve may be a tire valve. The other passage is always open but contains an adjustable throttling device that permits restricting the rate of flow to any desired degree.

When the pressure is first turned on and the pressure rises from zero to a maximum, the small size of the passage containing the tire valve provides a slight restraint to the flow and thus protects the gauge from the sudden impact.

During the pulsations, each time the pressure drops, the gauge pointer begins to move towards zero. The adjustable restriction in the passage which is not closed by the check valve allows the pressure in the gauge to drop at a rate so slow that the next pulsation in the line finds the gauge pointer still quite close to the maximum pressure reading. This requires only a small flow through the check valve to put the gauge back under maximum pressure. The pointer can readily respond since it does not have to travel over a large arc and inertia is therefore minimized.

Since the pointer of a gauge equipped with the invention vibrates only through a small arc, it is easy to read the maximum pressure.

An object of the invention is to reduce the fluctuations of the pointer of a gauge attached to a line subject to pulsating pressure.

2

A further object of the invention is to provide a guard for a gauge subject to pulsating pressures which facilitates reading the maximum pressures.

A further object of the invention is to provide such a guard having a passage containing a check valve through which the pressure reaches the gauge and a restricted passage through which the fluid flows away from the gauge when the pressure drops.

A further object of the invention is to provide a guard for a gauge of the type described in which the restricted passage can readily be regulated.

Figure 1:
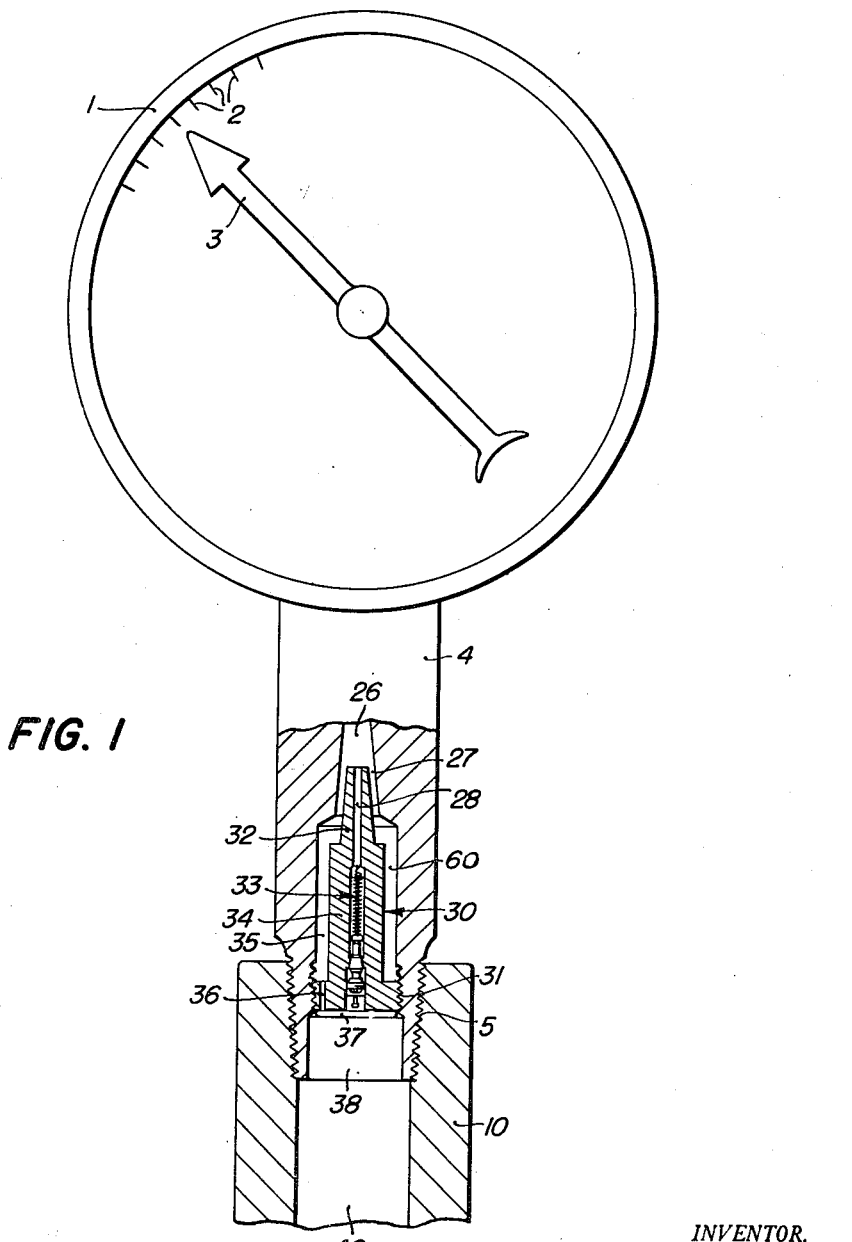
Fig. 1 is an elevation, partly in section, of one form of the invention.
Figures 2, 3:
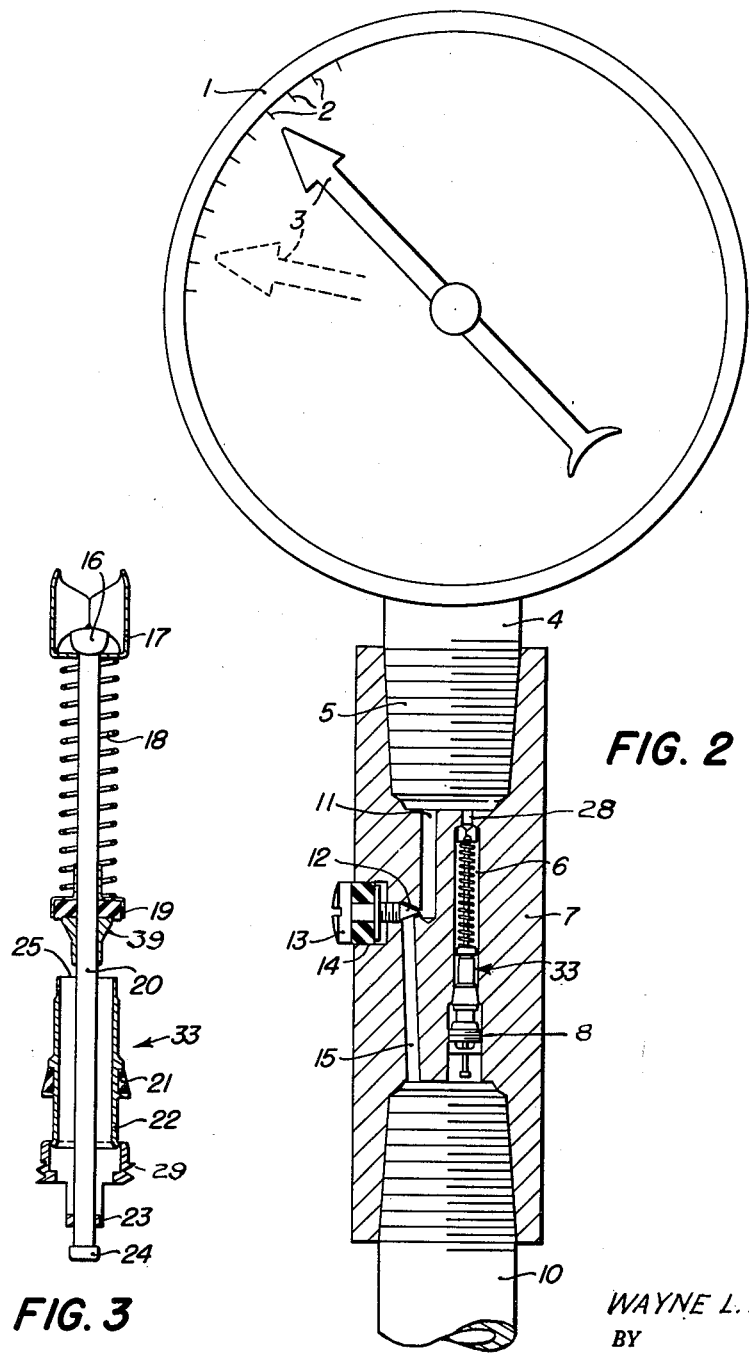
Fig. 2 is an elevation, partly in section, of another form of the invention.
Fig. 3 is a vertical section of the check valve drawn to a larger scale.

In both forms of the invention, one shown in Fig. 1 and the other shown in Fig. 2, the passage through which the fluid under pressure flows to the gauge but not from the gauge is near the center of the gauge support.

The passage which can be adjustably restricted and through which the fluid flows back from the gauge to the line is concentric with the passage containing the check valve in Fig. 1 and located to one side of it in Fig. 2.

The form shown in Fig. 1 calls for adjusting the device before the gauge is mounted on the pipe while the form shown in Fig. 2 permits adjusting after the gauge is mounted and in service.

In both forms of the invention, 1 is a pressure gauge having a pointer 3 which indicates the pressure on a scale 2. The pressure gauge has a stem 4. The gauge may be of any type, as, for example, a Bourdon tube gauge. The gauge stem 4 is either mounted directly on the pipe 10 containing the fluid whose pressure is to be measured by the pipe thread 5 as shown in Fig. 1 or else by an intervening coupling member 7.

Referring to Fig. 2, the passage 28 widens out into passage 6 to provide room for the check valve shown in Fig. 3. This check valve seats on a conical shoulder in the passage which widens still more and is finally threaded at 8. Fluid is thus able to flow from the passage 40 in pipe 10 to the inlet 26 of the gauge through the check valve. A suitable check valve assembly is generally indicated at 33 and shown on an enlarged scale in Fig. 3. This may comprise the tubular member 22 having external flanges that hold a conical rubber gasket 21 in place. The external thread 29 meshing into thread 8 permits forcing the gasket 21 against the conical shoulder in the passage 6. The check valve 19 rests upon the conical shoulder 39 of the stem 20. This stem 20 is guided at 23 in the tubular member 22. After assembly, the other end of the member 20 is compressed to form a head 16. This head 16 holds the cap piece 17 on the stem. When assembled, cap piece 17 bears against the shoulder where passage 6 joins passage 28 so that the pressure of spring 18 is on the disc 19 but not on the head 16. This pressure is kept light so that only a small amount of pressure is required to lift the check valve off its seat. However, this spring pressure together with the small size of the passages through the check valve permits checking any sudden violent inrush of fluid.

In the form of the invention shown in Fig. 1, the passage 28 and the check valve just beside it are placed in the center of the adjustable plug 30.

In this form of the invention, the central passage 26 in the gauge stem is a cone having a small included angle. This passage is shouldered and widens out into the cylindrical bore 60. At its lower end, this cylindrical bore is threaded. Below the threaded portion the bore is enlarged as shown at 38.

The adjustable plug 30 has a body 34 which is of smaller diameter than the bore 60, leaving a space 35 for the fluid to flow. A flange at the lower end of the plug is threaded at 31 permitting the plug to be adjusted up or down. The upper part of the plug is a cone 32 having the same included angle as the bore 26. A passage 36 is drilled through the flange of the plug. This may be drilled as shown or a slot like a key way may be milled across the flange. It thus appears that the fluid may at all times flow from the space 26 to the space 40 by passing through the narrow space 27 between the cone 32 and the sides of the passage 26, thence through space 35 and passes 36. The lower end of the adjustable plug carries a slot 37 into which a screw driver may be entered through the bore 38 before the gauge is assembled on line 10.

In the form shown in Fig. 2, the check valve shown in detail in Fig. 3, is mounted in the housing 7, and a passage 11 extends down from the space below the gauge stem 4 and another passage 15 extends upward from the pipe 10. These two passages communicate with each other by a conical horizontal bore, and screw 13 may be adjusted from the outside of the stem to act as a needle valve. The screw 13 is retained in its adjusted position in a novel manner that is leak proof. The head of screw 13 has a circumferential groove into which an annular rubber ring 14 fits. The ring is made slightly oversize so that when the screw 13 is screwed home, the ring 14 will be bearing around the sides of the opening preventing fluid from passing from the point 12 to the atmosphere.

In the operation of the device, the spring 18 is pre-set so that a slight initial pressure in the line is required to lift 19 from its seat 25. The greater the lift, the greater the compression of the spring, and thus there will be considerable delay in the effect of a pressure jump from zero to an assumed 100 pounds.

The cross-section of the return passage is regulated by moving plug 30 in Fig. 1 or screw 13 in Fig. 2. If the pressure fluctuates between 100 and 50, the screw 13 in Fig. 2 or the body 30 in Fig. 1 will be set so that as the pressure falls from 100 to 50 pounds and again rises to 100, fluid will have passed out of the gauge at a rate so slow that the gauge pointer will have receded only to, let us say, 85 pounds. Since it requires very little fluid passing from 10 through passage 6 to move the gauge pointer back to the 100 pound reading, no appreciable inaccuracy in the maximum reading of the pointer is introduced.

I claim:

1. In a device for protecting pressure gauges from wear by fluctuating pressures, a body having a bore a portion of which is tapered and which connects a source of pressure to a gauge, a plug longitudinally adjustable in said bore and having a tapered portion coaxial with the bore, a narrow passage connecting said source with the space between the tapered parts of the plug and the body and a larger passage which is in the axis of the plug both extending through the plug to allow passage of fluid through the bore independently of said narrow passage from the pressure source to the gauge; and a check value in the larger passage allowing flow in only one direction, said plug obstructing flow through said bore save through said passages.

2. In a device for protecting pressure gauges from wear by fluctuating pressures, a body having a bore a portion of which is conical and another portion of which is threaded and which connects a source of pressure to a gauge, a plug having a disc threaded in the second said portion which carries a conical extension coaxial with the axis of the bore and adapted to be adjusted longitudinally in said bore to leave an annular conical space between said bore and said plug, a narrow passage in the disc of the plug connecting with the annular conical space and a larger passage which is in the axis of the plug both passages extending through the plug to allow passage of fluid through the bore from the pressure source to the gauge, and a check valve in the larger passage allowing flow in only one direction.

3. In a device for protecting pressure gauges from wear by fluctuating pressures which can only be adjusted before the gauge is mounted on a line, a body having a bore a portion of which is conical and another portion of which is threaded and which connects a source of pressure to a gauge, a plug having a disc threaded in the second said portion which carries a conical extension coaxial with the axis of the bore and is adapted to be adjusted longitudinally in said bore to leave an annular conical space between said bore and said plug, a narrow passage in the plug connecting with the annular conical space and a larger passage which is in the axis of the plug both passages extending through the plug to allow passage of fluid through the bore from the pressure source to the gauge, and a check valve in the larger passage allowing flow in only one direction, and a slot in the end of said plug permitting the plug to be turned to vary the thickness of said conical space only before the gauge is mounted on a line.

4. A pressure gauge having in combination a housing, a stem having an axial bore which expands toward the end of the stem into a threaded section, a screw plug fitted into the expanded threaded section of the bore which has a central portion concentric with and extending toward the unexpanded section of said bore and a large axial passage through said portion of the plug which extends toward the unexpanded section of the bore and also a smaller passage outside the central portion, both passages allowing the fluid whose pressure is to be measured to pass through the plug through the gauge and a check valve in said larger passage allowing flow only toward the gauge.

WAYNE L. BUFFENMYER.

REFERENCES CITED

The following references are of record in the file of this patent:

UNITED STATES PATENTS

| Number | Name | Date |
|---|---|---|
| 995,247 | Garratt | June 13, 1911 |
| 1,451,038 | Faries | Apr. 10, 1923 |
| 2,391,583 | Martin | Dec. 25, 1945 |

FOREIGN PATENTS

| Number | Country | Date |
|---|---|---|
| 106,087 | Germany | Oct. 19, 1899 |
| 2,314 | Great Britain | Dec. 13, 1890 |